United States Patent [19]

Ferre et al.

[11] Patent Number: 4,707,738
[45] Date of Patent: Nov. 17, 1987

[54] ADAPTIVE PROCESS FOR THE CODING AND DECODING OF A SEQUENCE OF PICTURES BY TRANSFORMATION AND DEVICES FOR PERFORMING THIS PROCESS

[75] Inventors: Alain Ferre, Cresson Sevigne; Yannick Villalon, Rennes, both of France

[73] Assignee: Thomson Grand Public, Paris, France

[21] Appl. No.: 812,326

[22] Filed: Dec. 23, 1985

[30] Foreign Application Priority Data

Dec. 21, 1984 [FR] France ............................. 84 19646

[51] Int. Cl.$^4$ ............................................. H04N 7/12
[52] U.S. Cl. .................................. 358/135; 358/136; 358/138
[58] Field of Search ............... 358/133, 135, 136, 138, 358/260, 261; 375/27, 25

[56] References Cited

U.S. PATENT DOCUMENTS

| 3,761,613 | 9/1973 | Limb ..................................... 178/7.1 |
| 4,196,448 | 4/1980 | Whitehouse ......................... 358/135 |
| 4,217,609 | 8/1980 | Hatori et al. ......................... 358/136 |
| 4,245,248 | 1/1981 | Netravali et al. .................... 358/136 |
| 4,394,774 | 7/1983 | Widergren et al. .................... 358/13 |
| 4,581,638 | 4/1986 | Chiariglione ........................ 358/135 |
| 4,583,114 | 4/1986 | Catros ................................. 358/135 |
| 4,613,894 | 9/1986 | Catros ................................. 358/135 |

FOREIGN PATENT DOCUMENTS 0084270 7/1983 European Pat. Off. .
0123456 10/1984 European Pat. Off. .
3029190 3/1982 Fed. Rep. of Germany .

OTHER PUBLICATIONS

The Bell System Journal, vol. 58, No. 7, Sep. 1979, pp. 1703-1717.
International Conference on Communications, Conference Record, vol. 2 of 4, Jun. 14-18, 1981, pp. 22.5.1-22.5.6.

Primary Examiner—Michael A. Masinick
Attorney, Agent, or Firm—Cushman, Darby & Cushman

[57] ABSTRACT

This process uses a bidirectional transformation by blocks for images representing highly animated scenes and also uses a differential coding of the transformation coefficients when the pictures show slightly animated scenes. The coding device mainly comprises a cosine transformation device, a subtractor, and inter-image decoding device, a multiplexer, a device for discriminating the blocks showing highly animated scenes and blocks showing slightly animated scenes. The latter device controls the multiplexer. The subtractor and the decoding device make it possible to calculate the difference between each transformation coefficient and the homologous coefficient of the homologous block in the preceding picture. Moreover, a weighting device makes it possible to transmit with a larger number of bits the coefficients or coefficient differences corresponding to the low spatial frequencies of the images.

7 Claims, 7 Drawing Figures

FIG_2

INFORMATION QUANTITY
TO BE TRANSMITTED

FIG_3

FIG_4

FIG_5

ORDER OF COEFFICIENTS

FIG_6

ADAPTIVE PROCESS FOR THE CODING AND DECODING OF A SEQUENCE OF PICTURES BY TRANSFORMATION AND DEVICES FOR PERFORMING THIS PROCESS

BACKGROUND OF THE INVENTION

The present invention relates to an adaptive process for the coding and decoding of a sequence of images or pictures by transformation and to a device for performing this process. The object of such a process is to reduce the quantity of information to be transmitted or stored, when video pictures have been digitized.

It is known to effect a coding and decoding of a video picture by a bidirectional transformation of the cosine, Fourier, Hadamard, Haar, or Karhunen Loeve. Coding consists of dividing each picture into square blocks, applying the transformation to each block to obtain a matrix of values called transformation coefficients of the block and then transmitting these coefficients in a coded form. Decoding consists of decoding the coefficients and then restoring the digital values representing each point of a block by applying the inverse transformation to the matrix of the transformation coefficients of said block. The transformations used in practice are those for which there are fast algorithms, e.g. Fourier, Hadamard, Haar, and cosine transformations.

The IEEE article "Transactions on Communications", vol COM, 32, No 3, March 1984 describes an adaptive coding process consisting of quantifying the transformation coefficients in an adaptive manner, so that the blocks of coefficients containing a large amount of energy are quantizied with a larger number of quantification levels and a larger number of code bits than the blocks containing little energy. The image or picture is divided into 16×16 blocks. The digital values representing the points of each block are transformed by cosine transformation and then the thus obtained transformation coefficients are compared with a threshold. The coefficients higher than this threshold are normalized by multiplying them by a parameter supplied by a device for regulating the transmission rate.

The thus normalized coefficients are then quantizied and coded by a Huffman code, followed by storage in buffer memory which regulates the transmission rate. This buffer memory stores at a variable clock cycle the information to be transmitted, said clock cycle being dependent on the instantaneous energy of the picture. The buffer memory transmits the information at a constant rate. The degree of filling of this buffer memory and the rate of its input are monitored, and this determines the value of the normalized parameter.

Following transmission, the coded information arrives at a constant rate into a buffer memory, which passes them at a variable rate to a Huffman decoder. The transformations are then normalized by a normalization parameter which is the inverse of that used for coding, said inverse parameter being calculated by a rate regulating device which monitors the degree of filling of the buffer memory. The transformation coefficients are then added to the threshold value used for coding and are transformed by inverse transformation of the cosine transformation to restore the digital values representing points of a block.

The quality of the pictures restored is very good compared with other known methods, provided that the pictures correspond to highly animated (quickly changing) scenes. The visual quantity of the restored pictures is far less acceptable when they show only slightly animated or completely fixed scenes. In the latter case, two faults appear. It is possible to see a filtering of the high and medium spatial frequencies, said filtering corresponding to the elimination of low energy coefficients, which have a value below the threshold. It is also possible to see demarcations between the blocks in the uniform zones of the pictures, because the eye is sensitive to limited brightness differences in the uniform zones.

The object of the present invention is a coding and decoding process not suffering from the above disadvantage sense it permits an excellent restoration of fine details when the pictures show slightly animated or completely fixed scenes. The invention takes advantage of the redundancy of information existing in the sequence of pictures.

SUMMARY OF THE INVENTION

There is provided an adaptive process for the coding and decoding of a sequence of images by transformation, each image point being represented by a digital value, said coding comprising: subdividing each picture into blocks of points, applying a bidimensional transformation to each block to obtain a matrix of values called transformation coefficients of the block, discriminating whether each block represents a highly animated or slightly animated scene, transmitting the value of the transformation coefficients of one block in the first case or the difference in the value of these coefficients with respect to the value of homologous coefficients of the homologous block in the preceding picture in the second case, transmitting information indicating for each block whether it represents a slightly animated or highly animated scene; decoding consisting of: applying to the matrix of transformation coefficients a transformation which is the inverse of the transformation applied for its coding for each block representing a highly animated scene, or calculating, for each block, representing a slightly animated scene, a value of the coefficients of said block, by adding the value of each of the difference coefficients respectively to the value of the homologous coefficients of the homologous block in the preceding image and then applying the inverse transformation to the thus calculated coefficients.

The invention is described in further detail hereinafter relative to non-limiting embodiments and the attached drawings.

DESCRIPTION OF A PREFERRED EMBODIMENT

In one embodiment, the process according to the invention uses cosine transformation. When the cosign transformation is applied to a sequence of digital values $f(j,k)$ representing points of an image or picture for j and k varying from 0 to $N-1$ and designating the row and column containing the point, the transformation coefficients obtained are:

$$F(u,v) = \frac{4C(u) \cdot C(v)}{N^2} \sum_{j=0}^{N-1} \sum_{k=0}^{N-1} f(j,k) \cdot \cos\frac{(2j+1)u\pi}{2N} \cdot \cos\frac{(2k+1)v\pi}{2N} \quad (1)$$

for u, v=0, 1, ... N−1 and respectively designating a row and a column of the matrix of transformation coefficients and where:

$$C(w) = \frac{1}{\sqrt{2}} \text{ for } w = 0$$

C(w)=1 for w=1, 2 ... N−1

The inverse cosine transformation is defined by:

$$f(j,k) = \sum_{u=0}^{N-1} \sum_{v=0}^{N-1} C(u) \cdot C(v) \cdot F(u,v) \cdot \cos\frac{(2j+1)u\pi}{2N} \cdot \cos\frac{(2k+1)v\pi}{2N} \quad (2)$$

for u, v=0, 1, ..., N−1

Figure 1:
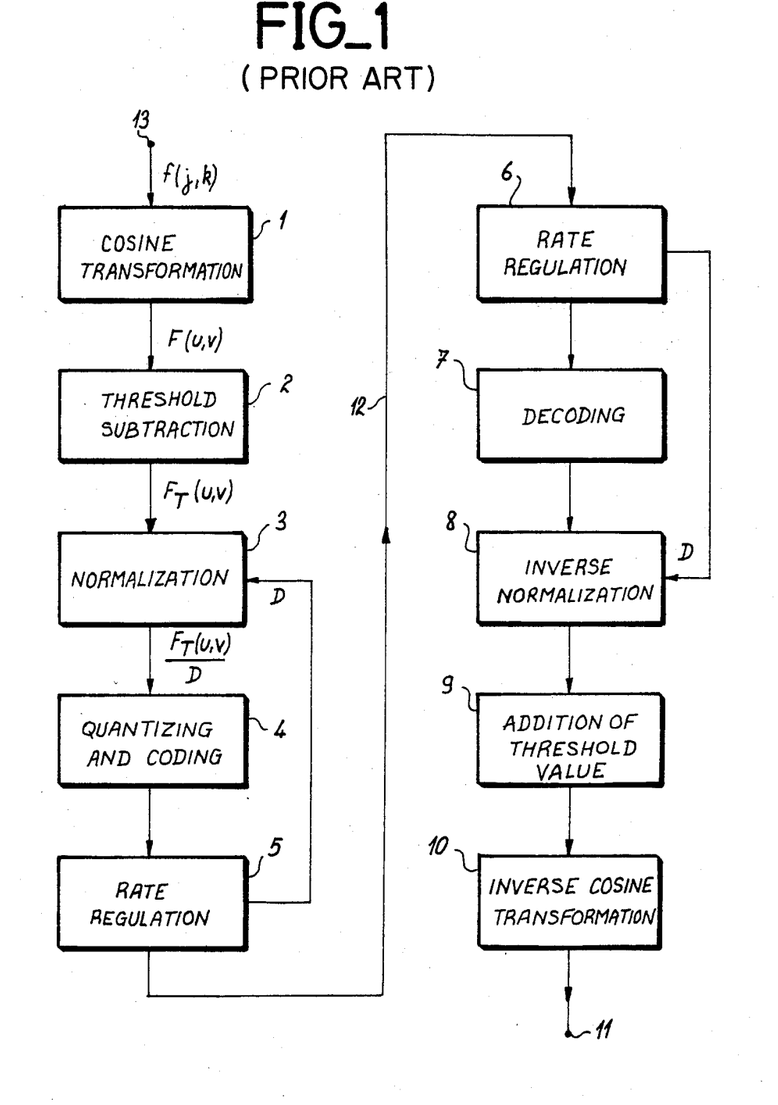
FIG. 1 shows a block diagram of an embodiment of a coding and decoding system performing the aforementioned known process.

FIG. 1 shows the block diagram of a coding and decoding system performing the process described in the previously mentioned document. The processed images or pictures are monochrome video pictures constituted by two interlaced fields, each field being processed as an independent picture. This embodiment comprises a cosine transformation device 1, a threshold subtraction device 2, a normalization device 3, a quantization and coding device 4, a first rate regulation device 5, a second rate regulation device 6, a decoding device 7, a inverse normalization device 8, a threshold value addition device 9 and an inverse cosine transformation device 10.

Device 1 receives a sequence of values f(j,k) representing the brightness of the points of a field by means of an input terminal 13 and restores a sequence of values F(u,v), which are the transformation coefficients successively for each point constituting each field. The values F(u,v) are applied to an input of device 2, which calculates the difference between this value and a fixed threshold value T. It restores a value $F_T(u,v)$ such that:

$$F_T(u,v) = F(u,v) - T \text{ if } F(u,v) \geq T$$

$$F_T(u,v) = 0 \text{ if } F(u,v) < T \quad (3)$$

The subtraction of this threshold has the effect of bringing most of the coefficients to a zero value and thus limits the number of coefficients to be quantizied and consequently the quantity of information to be transmitted.

The value $F_T(u,v)$ is applied to an input of normalization device 3, which receives a value 1/D called the normalization parameter on another input. Device 3 has an output supplying the normalized value $$\frac{F_T(u,v)}{D}.$$

The normalization performed in this way by device 3 makes it possible to adjust the range of values of the coefficients so as to be able to best use the number of bits fixed for the subsequent coding.

The normalized value of each transformation coefficient is applied to an input of the quantization and coding device 4. The quantization simply consists of converting a value expressed with a floating point into an integer value. Thus, a certain number of values between 0 and 1 are replaced by the value 0, which reduces the number of significant coefficients to be transmitted.

Coefficient F(O,O) corresponding to the first coefficient of the first row of the matrix of transformation coefficients of a block is coded in a special way to ensure that brightness differences between blocks are not perceived by the eye. This coefficient is linearly quantizied and is then coded by a nine bit code. The other non-zero coefficients are coded with respect to their value and address in the matrix by respectively reading in two table values coded in accordance with a Huffman code.

The coded values of such a code have a variable length, but are chosen in such a way that they can be identified without requiring separation information. Moreover, the coded values of the shortest lengths are attributed to coefficients or addresses appearing most frequently when a statistical study of the transformation coefficients is performed.

The address of each coefficient is not coded by the index of its row and the index of its column in the block matrix, but instead by a run length coding consisting of taking as the address the length of a run where the coefficients have a same value, the matrix of the coefficients being traversed in a defined order.

Figure 2:
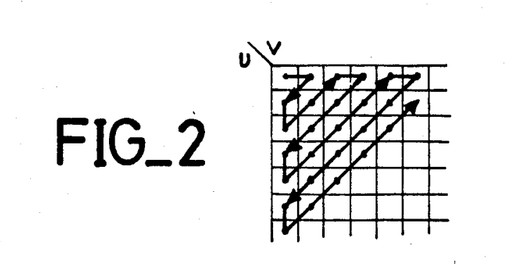
FIGS. 2 to 5 show graphs illustrating the process according to the invention.

FIG. 2 shows the upper left-hand corner of the matrix of transformation coefficients of a block and represents the zigzag path defining the order where the coefficients are considered for this run coding length. This order is also the order in which the coefficients F(u,v) are supplied by the output of the cosine transformation device 1. Such a path has the advantage that it encounters long runs of zero values making it possible to reduce the information quantity to be transmitted.

The first rate regulating device 5 receives the values coded by device 4 at a variable rate and transmits the same coded values at a constant rate on a transmission line 12. Device 5 has a shift register used as a buffer and control means for monitoring the filling of the register and for determining a normalization value D to be supplied to device 3.

An input of the second rate regulating device 6 is connected to transmission line 12 for receiving the coded values and for storing them in a shift register used as a buffer. An output of device 6 is connected to an input of decoding device 7. An output of device 7 is connected to an input of the inverse normalization device 8. Decoding device 7 supplies values decoded at irregular intervals due to the variable length of values coded in accordance with a Huffman code. The filling of the buffer registers in the regulating devices 5 and 6 is constantly symmetrical. Control means incorporated into device 6 generate a same value D, which is supplied to an input of the inverse normalization device 8. On another input, device 8 receives a value supplied by decoding device 7 and it multiplies said value by D to restore a value of a transformation coefficient.

One output of device 8 is connected to an input of device 9 for adding the threshold value and an output of device 9 is connected to an input of the inverse cosine transformation device 10. An output of device 10 is connected to an output terminal 11 and supplies a sequence of decoded brightness values. Device 9 adds the value T of the threshold to the values of the coefficients which have undergone subtraction by a value T by device 2 at the time of coding. Finally, device 10 forms the inverse cosine transformation which restores the brightness values of each point of each block.

The process according to the invention differs from the known process through the use of inter-picture coding for the pictures representing slightly animated or fixed scenes, while retaining intra-picture coding similar to that described hereinbefore for pictures showing highly animated scenes. The use of an inter-picture coding for slightly animated pictures makes it possible to utilize the correlation existing between two successive pictures.

The essential visual information of a picture corresponds to the lowest spatial frequencies and the latter correspond to the first coefficients of the matrix of transformation coefficients of said picture, when said matrix is traversed in zigzag manner in accordance with the path defined in FIG. 2. Thus, these first coefficients generally have a high energy, whereas the following coefficients have a low energy. In order to obtain a decoded picture having an acceptable minimum quality, coding and decoding must consequently transmit in priority manner the first coefficients of the matrix of transformation coefficients.

When a sequence of pictures shows a slightly animated or fixed scene, it is pointless to transmit the values of the first coefficients of the matrix for each picture, because these values vary only very slightly from one picture to the next. However, it is disadvantageous not to transmit the values of the following coefficients, which make it possible to reconstitute the fine details of each picture, these details being perceived at leisure by the eye exactly when the scene is slightly animated or fixed.

Thus, the process according to the invention consists of transmitting the values of transformation coefficients of a picture when the latter shows a highly animated scene, weighting the components such that little weight is given to the coefficients corresponding to medium and high spatial frequencies; or transmitting the variations of the transformation coefficients of a picture with respect to the previous picture, when said pictures show a slightly animated or fixed scene, the reduction in the quantity of the information obtained in this way being used to allocate more transmission bits to the values of the coefficients corresponding to the medium and high spatial frequencies.

The animation of the scene represented by the sequence of pictures can be estimated by comparing the values of the transformation coefficients of the homologous blocks of each of the pictures in the sequence. The process according to the invention consists of calculating the difference between the first transformation coefficients of each block and their homologs in the homologous block of the preceding picture and comparing the absolute values of these differences with a threshold and passing from intra-picture coding to inter-picture coding when at least one of the differences exceeds a fixed threshold. The homologous coefficients values used for calculating the differences are not exact values calculated according to theoretical formulas (1), but are instead those restored by coding and then decoding, because restored values are effectively available in the decoding device.

Figure 3:
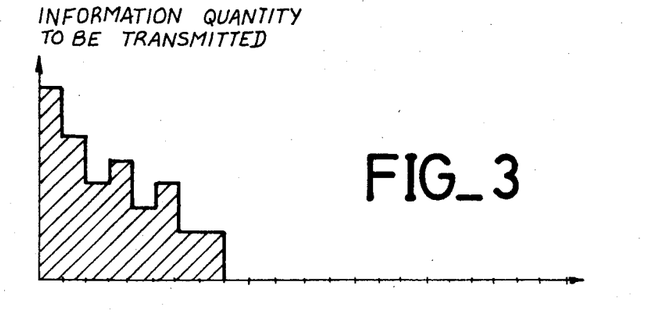
Figure 4:
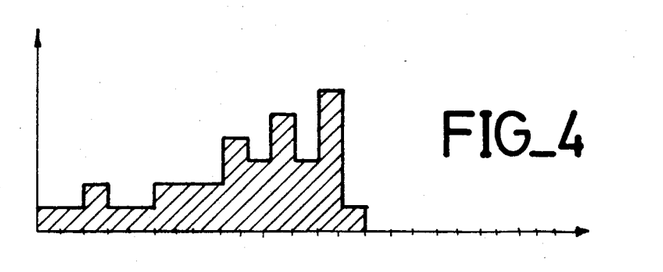
Figure 5:
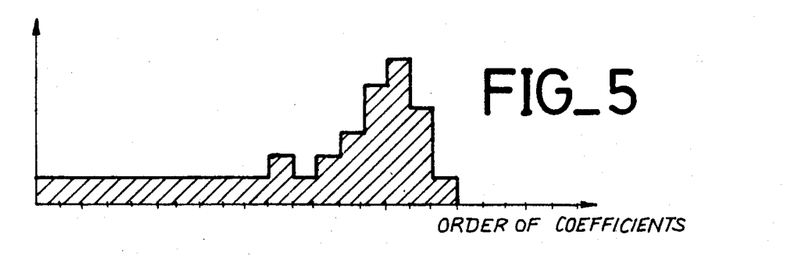

FIGS. 3 to 5 illustrate the process according to the invention applied to the coding of three successive pictures representing a fixed scene, the coded information being transmitted at a constant rate. Each of these figures shows a graph with, on the ordinate, the quantity of information effectively transmitted and, on the abscissa, the rank or order of the coefficients of the transformation matrix of each of these pictures. This rank is determined on the zigzag path shown in FIG. 2. FIGS. 3 to 5 consider the information quantity effectively transmitted after a difference calculation between the transformation coefficients of the picture in question and the transformation coefficients of the preceding picture, and after weighting, normalization and quantization.

The picture corresponding to FIG. 3 is different from the pictures which may have preceded it, so that the values of the transformation coefficients of this picture are very different from those of the transformation coefficients of the preceding picture. The distribution of the information transmitted is identical to the distribution of the information which would be transmitted by an intra-picture coding. It is for this reason that the information transmitted for the low order coefficients is high and the information transmitted for the higher order coefficients decreases as a function of said order.

The information transmitted for the very high order coefficients is zero, because the values of the differences of the transformation coefficients also undergo weighting favoring the low order coefficients compared with the high order coefficients, then a normalization controlled by the rate regulating device, and finally a quantization.

FIG. 4 corresponds to the following picture, which is identical by a hypothesis with the preceding picture. The transformation coefficients of this second picture are consequently theoretically strictly identical to those of the previous. However, the weighting, normalization and quantizing operations lead to coding errors resulting in a non-zero differences between the transformation coefficients before coding and the transformation coefficients after coding and then decoding. Thus, there are non-zero differences between the coded and then decoded coefficients for the first picture and the coefficients to be coded for the second picture.

FIG. 4 shows the information quantity corresponding to these differences after they have undergone weighting, normalization and quantization. The quantity of information constituted by these differences is small, the regulating device then controlling the normalization device to increase their values. Thus, FIG. 4 shows the quantity of information resulting from this increase. The quantity of information is maximum for the medium order or rank coefficients, because the coding errors for the first picture are significant with respect to the medium and high order coefficients. The coding of the difference values of the high order coefficients for the second picture is also erroneous, because the high order coefficients are disadvantaged compared with medium order coefficients due to the weighting operation.

FIG. 5 shows the quantity of information transmitted for a third picture. The differences between the coefficients of the third picture and the coded and then decoded coefficients of the second picture are small, because the low order coefficients and then medium order coefficients have been previously coded with a small coding error. The values of the differences to be transmitted for the low and medium order coefficients are consequently low and require few bits. The rate regulating device then modifies the normalization parameter to further increase the values of the differences of the coefficients, which then almost entirely correspond to the high order coefficients.

Thus, the third decoded picture will have information corresponding to low order coefficients, medium order coefficients and high order coefficients, i.e. will be reproduced with a high detail fineness. This process converges during three or four successive pictures. The process according to the invention is described hereinbefore in the hypothesis of a constant transmission rate, but can also be applied in the hypothesis of a variable transmission rate.

Figure 6:
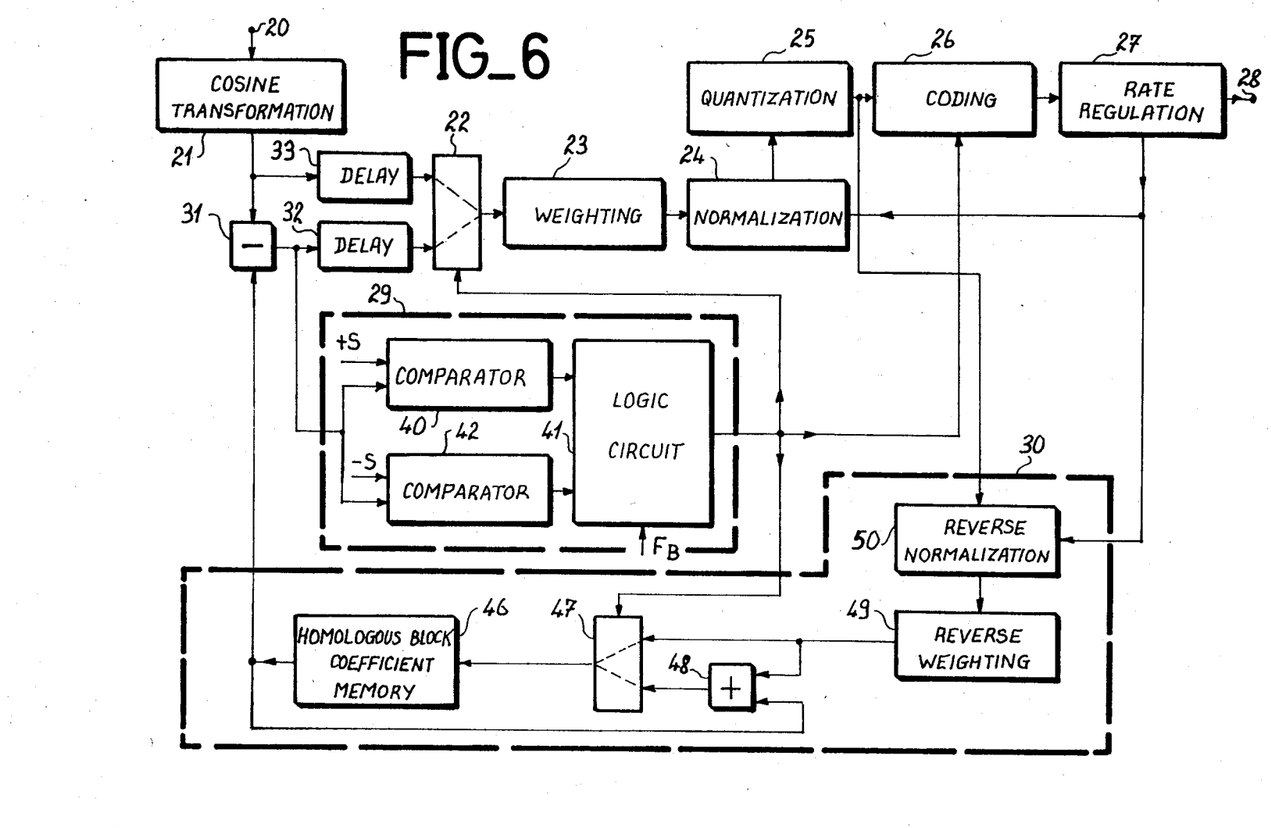
FIG. 6 shows a block diagram of an embodiment of a coding device according to the invention.

FIG. 6 shows block diagram of an embodiment of a coding device according to the invention for processing black and white television pictures constituted by two interlaced fields. Each pair of fields is considered as two successive pictures. It comprises a cosine transformation device 21, a digital subtracter 31, two delay devices 32, 33, a multiplexer 22 with two inputs and one output, a weighting device 23, a normalization device 24, a quantization device 25, a coding device 26, a rate regulating device 27, control means 29 and inter-field decoding means 30.

The cosine transformation device 21 has an input connected to an input terminal 20 of the coding device according to the invention for receiving a sequence of digital values representing image points. An output of device 21 is connected to the first input of subtracter 31 and to an input of the delay device 33. And output of means 30 is connected to the second input of subtracter 31 and the output of the latter is connected to an input of device 32 and to an input of means 29.

An input and an output of weighting device 23 are respectively connected to an output of multiplexer 22 and to an input of normalization device 24. An output of device 24 is connected to an input of the quantization device 25. An output of device 25 is connected to an input of coding device 26 and to a first input of means 30. An output of device 26 is connected to an input of the rate regulating device 27. Device 27 has a first output connected to an output terminal 28 of the coding device according to the invention and a second output connected on the one hand to a control input of normalization device 24 and to a second input of means 30. An output of means 29 is connected to a control input of multiplexer 22, to a control input of coding device 26 and to a third input of means 30.

Control means 29 has two comparators 40, 42 and a logic circuit 41. The input of means 29 is connected to a first input of comparator 40 and to a first input of comparator 42. Each of these comparators has a second input respectively receiving a threshold value $+S$ and a threshold $-S$. Each of them has an output respectively connected to an input of logic circuit 41. The latter has a clock input receiving a signal $F_B$ at the processing frequency of the blocks and an output constituting the output of means 29.

The inter-field decoding means 30 comprises a memory 46 for storing transformation coefficients of the homologous block of the block being processed, a multiplexer 47 with two inputs and one output, an adder 48, an inverse weighting device 49 and an inverse normalization device 50. The first, second and third inputs of decoding means 30 are respectively connected to a control input of multiplexer 47, as well as to first and second inputs of device 50. An output of device 50 is connected to an input of device 49. An output of the latter is connected to a first input of multiplexer 47 and to a first input of adder 48.

A second input of adder 48 and an output are respectively connected to an output of memory 46, which constitutes the output of means 30 and to a second input of multiplexer 47. An output of multiplexer 47 is connected to a data input of memory 46. The latter can be constituted by a shift register controlled by a clock signal at the analysis frequency of the points, said frequency corresponding to the processing frequency of each transformation coefficient. The stage number of this register is equal to the number of points per picture field less ten points to take account of the delay provided by device 32.

The cosine transformation device 21 is responsible for breaking up each picture into blocks of $16 \times 16$ points and calculates for each block a matrix of transformation coefficients by the aforementioned cosine transformation. The values of the coefficients of each block are supplied successively to device 33 in the order defined by FIG. 2 and are applied to the first input of subtracter 31 for calculating the difference of each coefficient with respect to the homologous coefficient of the homologous block in the preceding frame, the decoding means 30 supplying the value of this homologous coefficient to the second input of subtracter 31. The values of the differences supplied by the output of subtracter 31 are delayed by device 32 and are then applied to the second input of multiplexer 22. The latter transmits them if the block represents a slightly animated or fixed scene, if not it transmits the values of the coefficients supplied by device 33.

Multiplexer 22 is controlled by a logic signal supplied by the output of control means 29. The input of means 29 receives the difference calculated by subtracter 31 and compares it on the one hand with the threshold value $+S$ and on the other hand with the threshold value $-S$ by means of comparators 40 and 42. Threshold $+S$ corresponds to positive differences and threshold $-S$ to negative differences. When the absolute value of the difference value between two homologous coefficients exceeds the threshold value, comparator 40 or comparator 42 supplies a logic signal to circuit 41, which supplies a logic signal corresponding to an intrafield coding throughout the coding period of one block if the difference exceeds the threshold for at least one of the ten first coefficients of the block. The working out of the choice of the type of coding makes it necessary to consider the first ten coefficients of each block and it is for this reason that the delay devices 33, 32 are provided for delaying the value supplied by device 21 and by subtracter 31 by a time corresponding to ten coefficients, i.e. corresponding to ten picture points.

Delay devices 33, 32 can each be constituted by a ten stage shift register controlled by a clock signal with the clock cycle of the analysis of the picture points. Logic circuit 41 is a sequential circuit, which can be constructed by the Expert without involving him in inventive activity. This also applies to the cosine transformation device 21, because cosine transformation is widely used for coding pictures.

Weighting device 23 applies a same weighting no matter what type of coding is taking place. This weighting consists of multiplying the value applied to its input by a coefficient to equal to exp to $$\frac{-(u^2 + v^2)}{15^2},$$

u and v being respectively the index of the row and the index of the column of the coefficient being coded in the transformation matrix. When indices u and v increase, the weight applied to the coefficient decreases. The coefficients with the high indices, i.e. corresponding to high spatial frequencies are consequently multiplied by values close to zero. The values of indices u and v are determined by not shown, synchronisation and control means, whose construction is within the scope of the Expert.

Normalization device 24 multiplies the values applied to its input by a variable coefficient supplied by the rate regulating device 27. Quantization device 25 transforms the values applied to its input with a floating point into interger values. Coding device 26 codes by two Huffman codes, the value and address of the coefficients or coefficient differences applied to its input. The coding of the address is a run coding length, the coefficients being processed in the order shown in FIG. 2. This coding makes it possible to greatly reduce the quantity of information to be transmitted by taking advantage of the fact that a large number of high order coefficients have a zero value and are distributed in runs having significant lengths. Device 26 inserts in the sequence of coding information a code word indicating the change of coding type under the action of the logic signal supplied by the output of means 29.

Rate regulating device 27 incorporates a shift register used as a buffer memory and control means monitoring the filling of said register and calculating a value of the normalization parameter as a function of said degree of filling, e.g. by means of a table stored a in read-only memory. Decoding means 30 makes it possible to restore a sequence of transformation coefficients which have been coded, then decoded and stored for a time corresponding to one field. Coding means 30 are connected to the output of quantization device 25 for sampling a sequence of values to be decoded.

This sequence of values is applied to the inverse normalization device 50, which receives the value of the normalization parameter supplied by device 27. Device 50 multiplies the value to be decoded by the inverse of the normalization parameter e.g. by means of a table stored in the read-only memory. Device 50 supplies a sequence of values to the inverse weighting device 49, which multiplies each of the values by a weight equal to $$\exp \frac{u^2 + v^2}{15^2}.$$

If the coding taking place is an intra-field coding, the multiplexer 47, controlled by control means 29, transmits the sequence of values supplied by the inverse weighting device 49. If the block being coded undergoes inter-field coding, multiplexer 47 transmits a sequence of values supplied by the adder 48, which effects the restoration of the values of the coefficients by adding the value of the homologous coefficient of the homologous block in the preceding field to the difference value which is then supplied by device 49.

The values of the decoded coefficients supplied by the output of multiplexer 47 are stored in memory 46 for a time equivalent to the processing of one field, less ten points. The value restored by the memory 46 is used for calculating a coefficient difference value by means of subtracter 31 and for simultaneously decoding the same coefficient difference value by means of adder 48.

Figure 7:
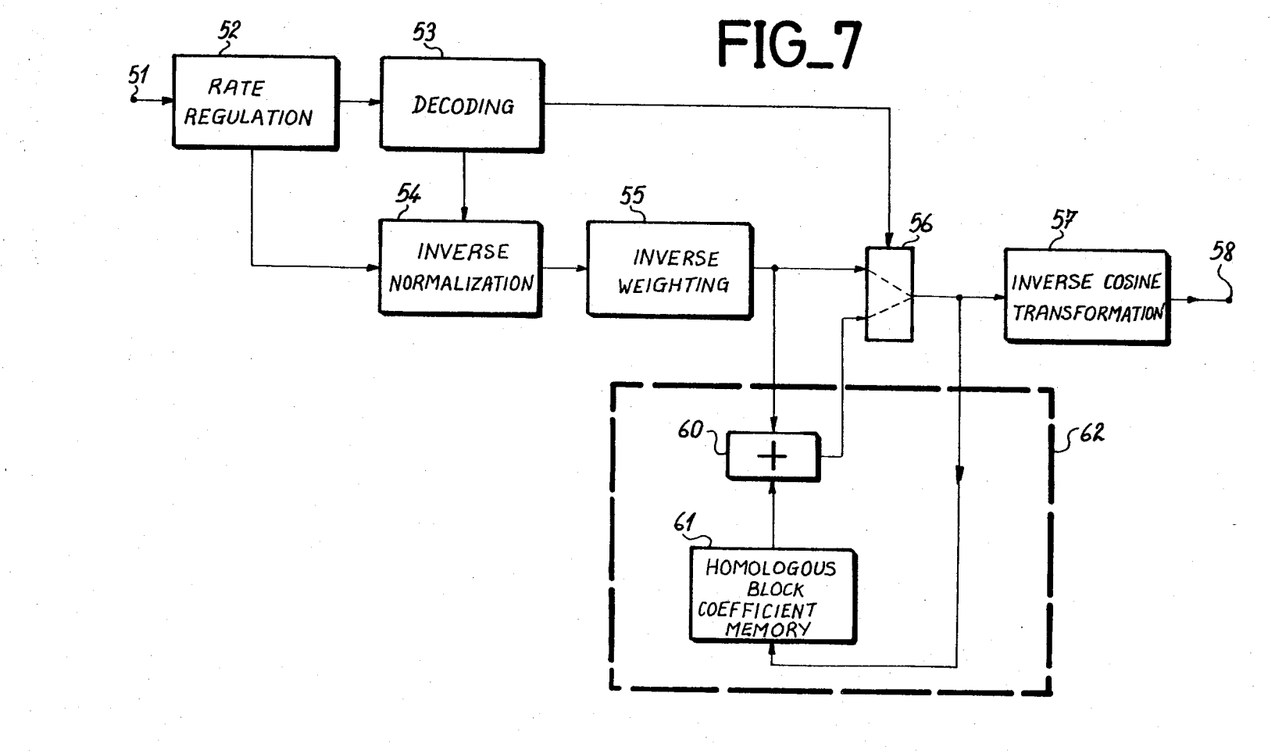
FIG. 7 shows a block diagram of an embodiment of a decoding device according to the invention.

FIG. 7 shows the block diagram of an embodiment of a decoding device according to the invention making it possible to decode the coded values supplied by the coding devices described hereinbefore. This coding device comprises a rate regulating device 52, a decoding device 53, an inverse normalization device 54, an inverse weighting device 55, a multiplexer 56 with two inputs and one output, an inverse cosine transformation device 57 and an inter-field decoding device 62.

One input of the rate regulating device 52 is connected to an input terminal 51 receiving coded values. Device 52 has a first output connected to an input of decoding device 53 and a second output connected to a control input of the inverse normalization device 54. Decoding device 53 has an output connected to an input of device 54. An output of the inverse normalization device 54 is connected to an input of the inverse weighting device 55. The latter has an output connected to a first input of multiplexer 56 and to a first input of means 62. Means 62 has an output connected to a second input of multiplexer 56. Multiplexer 56 has an output connected to a second input of means 62 and to an input of device 57. An output of device 57 is connected to an output terminal 58 of the decoding device according to the invention.

The inter-field decoding means 62 has a memory 61 for storing the coefficients of the block in the preceding image which is homologous to the block being decoded. The first input of means 62 is connected to a first input of adder 60. The second input of means 62 is connected to a data input of memory 61. An output of the latter is connected to a second input of adder 60. An output of adder 60 is connected to the output of means 62.

By input terminal 51, rate regulator 52 receives a sequence of binary values having a constant clock cycle, but transmitting values of coefficients coded with a variable clock cycle. The decoding device 53 must restore the coefficients or coefficient differences at a constant clock cycle corresponding to the clock cycle for the analysis and restoration of a field. Thus, regulating device 52 has a buffer memory constituted by a shift register, in which are entered at a constant clock cycle the binary values received by input terminal 51. These binary values are decoded at a variable clock cycle by decoding device 53 in accordance with the tables of the Huffman codes used for coding by recalculating the addresses which have been coded by run length coding. The filling of the buffer memory of device 52 is strictly symmetrical to the filling of the buffer memory in the rate regulating device 27 for coding.

Device 52 has control means monitoring said filling and which determine the same normalization parameter as in the coding device. This normalization parameter is applied to the inverse normalization device 54, which multiplies each value applied to its input by the inverse value of the normalization parameter. Device 54 can be identical to device 50 and can be constituted by a read-only memory storing a table of values. The inverse weighting device 55 multiplies each of the values successively applied to its input by a weight equal to $$\exp \frac{u^2 + v^2}{15^2}.$$

The values of indices u and v are determined by not shown synchronisation and control means and whose construction falls within the scope of the Expert.

On its first input, multiplexer 56 receives values directly supplied by the output of device 55 and on its second input receives a value decoded by means 62. Means 62 decodes the coefficient difference values by adding, using adder 60 to add the value of the homologous coefficient of the homologous block in the preceding image or picture.

The decoding device 53 detects the binary words inserted in the sequence of coded information to indicate changes to the coding type and supplies a control signal to multiplexer 56. The latter transmits the values supplied by the output of device 55 when intra-field coding is involved and transmits the value supplied by the output of said means 62 when an inter-field coding is involved. The output of multiplexer 56 consequently supplies a sequence of decoded coefficient values to the inverse cosine device 57, which restores a sequence of brightness values in the order in which they where analysed.

The invention is not limited to the embodiments described hereinbefore and numerous variants fall within the scope of the Expert, particularly for constructing the control means 29 detecting the degree of animation of each block and for choosing the transformation type.

Coding and decoding of colour television pictures can also be carried out by the parallel processing of three sequences of digital values corresponding to one brightness signal and two colour difference signals.

The invention can be more particularly applied to the transmission or storage at a reduced rate of television pictures.

What is claimed is:

1. An adaptive process for the coding and decoding of a sequence of images by transformation, wherein each image is represented by a matrix of digital points, comprising the steps of:
    subdividing each image into blocks of points;
    applying a bidirectional transformation to each block of points to obtain a matrix of values representing transformation coefficients of the block;
    determining whether each block represents a highly or slightly animated scene;
    transmitting the transformation coefficients of the block, if the block represents a highly animated scene;
    transmitting the differences between the transformation coefficients of the block and homologous coefficients of the homologous block in the preceding image, if the block represents a slightly animated scene;
    for each block representing a highly animated scene, applying to the transformation coefficients of the block a transformation which is the inverse of the transformation applied for coding;
    for each block representing a slightly animated scene, adding the transmitted difference coefficients of the block to homologous coefficients of the homologous block in the preceding image, and then applying the inverse transformation to the sums.

2. A process as in claim 1, wherein the determination of whether a block represents a highly or slightly animated scene comprises:
    calculating the difference between each transformation coefficient of the block and the homologous coefficient of the homologous block in the preceding image;
    comparing the absolute value of this difference to a threshold value; and
    determining, from this comparison performed for coefficients corresponding to low spatial frequencies, whether the block represents a highly animated or slightly animated scene.

3. A process as in claim 1, further comprising weighting the values of transformation coefficients and transformation coefficient differences before transmitting, in order to adjust the range of the coefficients so that the coefficients corresponding to low spatial frequencies have larger ranges than do the coefficients corresponding to high spatial frequencies.

4. A device for adaptively coding a sequence of images by transformation, wherein each image is subdivided into blocks of points, comprising:
    transformation means for receiving digital points representing a block of a present image and transforming the digital points into digital transformation coefficients corresponding to the block;
    means for supplying the homologous block of digital transformation coefficients for the preceding image;
    subtracter means, coupled to the transformation means and supplying means, for calculating a sequence of differences between the transformation coefficients of the block of the present image and the homologous transformation coefficients of the homologous block of the preceding image;
    discriminating means, coupled to the subtracter, for determining from the sequence of differences, whether blocks represent highly animated scenes or slightly animated scenes;
    means for selectively transmitting either the digital transformation coefficients from the transformation device or the sequence of difference coefficients supplied by the subtracter, along with information indicating whether the coefficients represent a highly or slightly animated block.

5. A coding device as in claim 4, wherein the selective transmitting means comprises in series:
    multiplexer means coupled to an output of the transformation means and to an output of the subtracter, the multiplexer being controlled by the discriminating means;
    weighting means, coupled to an output of the multiplexer, for decreasing the range of the digital values supplied to the device when those values correspond to high spatial frequency transform coefficients or coefficient differences;
    normalization means for increasing or decreasing the range of the digital values leaving the weighting device, by multiplying those values by a normalization parameter;
    quantization means for eliminating the decimal part of the coefficient values or coefficient difference values leaving the normalization means;
    coding means for coding by Huffman codes the values and addresses of the coefficients and coefficient differences before they are transmitted, and for generating a code word indicative of whether a transmitted block of coefficients or coefficient differences represents a highly or slightly animated scene; and transmission rate regulation means for supplying the normalization parameter to the normalization means.

6. A device for adaptively decoding a sequence of images by transformation, wherein each image has been subdivided into blocks of data points and each block has been represented by a matrix of coefficients obtained by a bidimensional transformation, and each coefficient has been represented by a coded value, comprising:

receiving means, (i) for receiving coded data composed of coded coefficient values and a code word indicative of whether the data block represents a slightly or highly animated scene, (ii) for generating a control signal indicative of whether the data received corresponds to a slightly or highly animated scene, and (iii) for restoring decoded values of transformation coefficients or differences of coefficients, corresponding to a coefficient matrix obtained from the bidirectional transformation;

determining means, for determining a value for each transformation coefficient of a block of the present image, by adding the decoded value supplied by the receiving means to the value of the homologous transformation coefficient of the homologous block of the preceding image;

multiplexer means, controlled by the control signal from the receiving means, for selectively transmitting to a transformation device either the decoded values restored by the receiving means or the values generated by the determining means;

transformation means for applying a transformation which is the inverse of the transformation applied for the coding of the data, and which is coupled to the multiplexer means output and which serves to restore the digital values representing the image points.

7. A decoding device as in claim 6, wherein the receiving means comprises in series:

rate regulating means for receiving coded data at a constant binary rate and for determining the value of a normalization parameter;

decoding means for decoding the coded data received by the regulating device and for supplying at a constant clock frequency a sequence of transformation coefficients or coefficient differences and for decoding the codeword indicating whether the block corresponding to said data represents a highly animated or slightly animated scene and for generating a corresponding logic signal to control the multiplexer means;

normalization means coupled to an output of the decoding means for multiplying by a value of a normalization parameter the values decoded by the decoding device; and an inverse weighting means coupled to an output of the inverse normalization means for applying to the values supplied by the latter a weighting which is the inverse of that applied during coding.

* * * * *